United States Patent
Wang

(10) Patent No.: US 10,997,789 B2
(45) Date of Patent: May 4, 2021

(54) AUGMENTED REALITY GLASSES

(71) Applicant: BOE TECHNOLOGY GROUP CO., LTD., Beijing (CN)

(72) Inventor: Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 16/089,695

(22) PCT Filed: Feb. 1, 2018

(86) PCT No.: PCT/CN2018/074892
§ 371 (c)(1),
(2) Date: Sep. 28, 2018

(87) PCT Pub. No.: WO2019/000946
PCT Pub. Date: Jan. 3, 2019

(65) Prior Publication Data
US 2020/0320790 A1    Oct. 8, 2020

(30) Foreign Application Priority Data

Jun. 26, 2017   (CN) .......................... 201710494134.7

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G02B 27/0176* (2013.01);
(Continued)

(58) Field of Classification Search
CPC .......................... G06T 19/006; G02B 27/017; G02B 27/0172; G02B 27/0176; G02B 2027/0132; G02C 5/22; G02C 5/2281; G02C 3/003
(Continued)

(56) References Cited

U.S. PATENT DOCUMENTS 5,321,416 A * 6/1994 Bassett ................. A42B 3/145
345/8
10,732,418 B2 * 8/2020 Tatsuta ................. G02B 27/02
(Continued)

FOREIGN PATENT DOCUMENTS

| CN | 204229050 | 3/2015 |
| CN | 104503083 | 4/2015 |

(Continued)

OTHER PUBLICATIONS

International Search Report and Written Opinion of the International Searching Authority for corresponding PCT Application No. PCT/CN2018/074892 (Foreign Text, 11 pages; English Translation, 7 pages) (dated Apr. 28, 2018).

*Primary Examiner* — Jimmy H Nguyen
(74) *Attorney, Agent, or Firm* — Myers Bigel, P.A.

(57) ABSTRACT

The present disclosure relates to the field of augmented reality technology, and in particular to augmented reality glasses. The augmented reality glasses include: a headgear assembly configured to secure the augmented reality glasses on a user's head; an optomechanical assembly; a frame assembly configured to carry the optomechanical assembly; and a damping rotary structure configured to rotatably connect the headgear assembly and the frame assembly such that when the augmented reality glasses are worn on a user's head, the user is allowed to see a picture displayed by the optomechanical assembly.

15 Claims, 4 Drawing Sheets

(51) Int. Cl.
*G02C 5/22* (2006.01)
*G02C 3/00* (2006.01)

(52) U.S. Cl.
CPC ............... *G02B 2027/0132* (2013.01); *G02B 2027/0138* (2013.01); *G02B 2027/0178* (2013.01); *G02C 3/003* (2013.01); *G02C 5/2281* (2013.01)

(58) Field of Classification Search
USPC ........................................................ 345/7–9
See application file for complete search history.

(56) References Cited

U.S. PATENT DOCUMENTS

| | | | |
|---|---|---|---|
| 2016/0062119 | A1* | 3/2016 | Fitch ................. G02B 27/0176 359/630 |
| 2016/0163221 | A1* | 6/2016 | Sommers ............... G09B 19/00 434/234 |
| 2016/0165223 | A1 | 6/2016 | Liu et al. |
| 2016/0370590 | A1* | 12/2016 | Fujishiro ............ G02B 27/0176 |
| 2017/0176755 | A1 | 6/2017 | Cai et al. |
| 2017/0202722 | A1 | 7/2017 | Lei et al. |

FOREIGN PATENT DOCUMENTS

| | | |
|---|---|---|
| CN | 105158899 | 12/2015 |
| CN | 204883059 | 12/2015 |
| CN | 204964925 | 1/2016 |
| CN | 105487232 | 4/2016 |
| WO | 2017/106873 | 6/2017 |

* cited by examiner

AUGMENTED REALITY GLASSES

CROSS REFERENCE TO RELATED APPLICATIONS

The present application is a 35 U.S.C. 371 national stage application of PCT International Application No. PCT/CN2018/074892, filed on Feb. 1, 2018, which claims the benefit of Chinese patent application No. 201710494134.7, filed on Jun. 26, 2017, the contents of which are incorporated herein by reference in their entireties.

TECHNICAL FIELD

The present disclosure relates to the field of augmented reality technology, and in particular to augmented reality glasses.

BACKGROUND

Augmented reality (AR) is a new technology that integrates information from the real world and the virtual world "seamlessly". Specifically, by means of techniques such as electronic computer processing, AR technology applies virtual information to the real world by simulation and then superimposition, and the result is perceived by human senses. Therefore, a sensory experience that transcends reality is achieved. In this case, the real environment and the virtual object are superimposed in the same picture or space in real time. The augmented reality technology not only displays real-world information, but also displays virtual information at the same time, so that the two kinds of information complement and superimpose each other. In the visual augmented reality technology, the real world and computer graphics are multi-synthesized by using a helmet display. With maturity of the market, a variety of augmented reality products have emerged, especially head-mounted AR glasses. Such AR products are widely used in medical, gaming and other fields due to their stable experience environments.

In conventional AR glasses, a single screw fastener is typically used to obtain the engagement between a headgear and a frame. However, the rotation of such a single screw fastener is generally not smooth and the degree of freedom is not stable. In addition, when the relative positions between the headgear and the frame are inconsistent, for example, when the frame is at a large angle with respect to the headgear, the active display area of the optomechanical assembly often cannot be parallel to the eyeball section of the user, which greatly weakens the user's viewing experience.

SUMMARY

According to an embodiment of the present disclosure, augmented reality glasses are proposed. Such augmented reality glasses include a headgear assembly, an optomechanical assembly, a frame assembly, and a damping rotary structure. In particular, the headgear assembly is configured to secure the augmented reality glasses to a user's head. Additionally, the frame assembly is configured to carry an optomechanical assembly, such as an optomechanical assembly that displays a picture to the user during operation. Further, the damping rotary structure is configured to rotatably connect the headgear assembly and the frame assembly such that when the augmented reality glasses are worn on the user's head, the user is allowed to see a picture displayed by the optomechanical assembly. In the above augmented reality glasses, smooth engagement is obtained between the frame assembly and the headgear assembly by employing a damping rotary structure. In this way, rotation of the frame assembly and the headgear assembly is facilitated, and problems such as lack of smooth, unstable degree of freedom, and the like are further avoided. According to a specific embodiment, in the augmented reality glasses, the frame assembly is U-shaped. In such a case, the damping rotary structure includes two sub-damping rotary structures, and the two sub-damping rotary structures are respectively located at two ends of the U-shaped frame assembly. That is, a rotatable connection between the frame assembly and the headgear assembly is accomplished at two ends of the frame assembly. Of course, those skilled in the art will appreciate that this special positioning of the damping rotary structure at two ends of the frame is merely one specific example for illustrating the principle of the present disclosure, and the disclosure should in no way be considered as being limited thereto. With teachings obtained from the present disclosure, those skilled in the art will readily appreciate that the damping rotary structure can be placed anywhere on the frame assembly and further anywhere on the headgear assembly, so as to achieve a smooth connection between the two.

According to a further embodiment, optionally, the U-shaped frame assembly has an open portion, and at a position opposite to the open portion, the U-shaped frame assembly further includes a recess portion. Such a recess portion penetrates through the U-shaped frame assembly in a thickness direction of the U-shaped frame assembly, and is configured to receive the optomechanical assembly and other potential assemblies. Of course, as will be appreciated by those skilled in the art, the optomechanical assembly can also be placed anywhere else in the U-shaped frame assembly, as long as pictures can be displayed to the user during operation.

According to a further alternative embodiment, in the augmented reality glasses, the headgear assembly has an annular shape, and the headgear assembly is further provided with a knob. Exemplarily, such a knob is configured to adjust the size of the annular headgear assembly so as to accommodate different head sizes. Specifically, by adjusting the knob, the diameter of the annular headgear assembly can be enlarged or reduced, thereby facilitating wearing by different users. Likewise, as will be readily appreciated by those skilled in the art, other similar adjustment mechanisms can be provided for the headgear assembly, so as to allow for flexible adjustment of the headgear's size. Moreover, the present disclosure does not impose any particular limitation on the positioning of such an adjustment mechanism and the manner in which it is further deployed.

Further, as an optional example, in the augmented reality glasses provided by embodiments of the present disclosure, the optomechanical component includes: an input interface for receiving a signal; a display; and optics for directing the signal into the display for display. In particular, the display is configured to display a picture toward the user's eyes when the augmented reality glasses are worn on the user's head. Exemplarily, such a display also includes a display area, and during normal operation of the augmented reality glasses, the display area allows the displayed picture to enter the user's eyes.

Alternatively, the optomechanical assembly further includes an imaging element. Exemplarily, such an imaging element is configured to record a scene in front of the user, optionally in real time. By means of real-time scene capture of the augmented reality glasses, the surrounding real world information is allowed to be superimposed with information pre-stored in the glasses, providing the user with a rich visual experience.

According to a further embodiment, in the augmented reality glasses, the frame assembly includes an inner casing and an outer casing. When the augmented reality glasses are worn on the user's head, the inner casing of the frame fits the user's head while the outer casing is exposed outside. Further optionally, the frame assembly further includes an interior space sandwiched between the inner casing and the outer casing. In such an interior space, other optional components are further provided. As an example, the damping rotary structure includes: a screw, an elastic spacer, a damping element, and a stud. In such a case, the screw passes through the headgear assembly and the elastic spacer, and engages with the damping element. That is, the elastic spacer and the damping element are stacked on the outer side of the headgear assembly, and the inner side of the damping element is threaded for engagement with the screw. In addition, the damping element also passes through the inner casing of the frame assembly, and ultimately engages with the stud, wherein the stud is disposed on the outer casing of the frame assembly. Exemplarily, the engagement between the damping element and the stud on the outer casing of the frame can be accomplished by means of a threaded connection. That is, the damping element and the stud are both provided with corresponding threads.

According to another embodiment, in the augmented reality glasses, the display is configured to rotate in a reverse direction with rotation of the frame assembly. As will be readily appreciated by those skilled in the art, if the active display area of the display allows the displayed picture to enter the user's eyes substantially vertically, this is extremely advantageous for the user experience, because it provides the most comfortable viewing experience. In particular, when the frame assembly is worn substantially horizontally onto the user's head, the screen information provided by the display will propagate in a horizontal direction and enter perpendicularly to the user's eyes. For such augmented reality glasses, if the frame is rotated within a vertical plane, the display is required to be rotated in a reverse direction correspondingly so as to ensure that the user can receive the displayed picture enters the eyes vertically at any position. To achieve this, the augmented reality glasses are also provided with a rotation transmission member. Such a rotation transmission member is configured to synchronize rotation of the frame assembly with rotation of the display, optionally with the two directions of rotation being reverse and the angle of rotation being equal. In such a case, when the augmented reality glasses are worn on the user's head, the picture displayed by the display enters the user's eyes substantially vertically, thereby providing an optimal user experience.

In a specific implementation, the rotation transmission member is disposed inside the frame assembly, optionally between the outer casing of the frame and the inner casing of the frame. Further, the rotation transmission member includes three sub-members, i.e., a first transmission component, a second transmission component, and a third transmission component. Specifically, the first transmission component is disposed adjacent to the damping rotary structure and engaged with the frame assembly; the second transmission component is engaged with the optomechanical assembly, that is, disposed adjacent to the optomechanical assembly; and the third transmission component is configured to implement connection between the first transmission component and the second transmission component.

According to a specific embodiment, the first transmission component includes: a first rotating shaft connection gear, a first rotating member, as well as a first rotating shaft joint connecting the first rotating shaft connection gear and the first rotating member. Additionally, such a first rotating shaft connection gear is also configured to engage with a transmission gear disposed on the outer casing of the frame assembly, so as to achieve engagement between the first transmission component and the frame assembly.

According to a further embodiment, the second transmission component includes a limit block. Specifically, one end of such a limit block is provided with a second gear, and the second gear is configured to engage with the third transmission component. Optionally, the second gear is configured to engage with a third rotating shaft connection gear of the third transmission component (described in further detail below). In addition, limit slots are provided inside the limit block. The limit slots are configured to engage with a limit hole in the optomechanical assembly, such that the display can rotate in a reverse direction with rotation of the frame assembly. Further alternatively, the limit slots in the limit block are further configured to be able to decouple from the limit hole in the optomechanical assembly. In this way, rotation of the optomechanical assembly (optionally, the display or the active display area) is allowed to be decoupled from rotation of the frame assembly, and thereby facilitates a manual adjustment of positioning of the display by the user without influences by motion (optionally, rotation) of the frame assembly.

According to another embodiment, the third transmission component includes: a third rotating shaft connection gear, a third rotating member, and two third rotating shaft joints. In particular, the third rotating shaft connection gear is configured to engage with the second transmission component (optionally, the second gear of the second transmission component, as described above). Furthermore, one of the two third rotating shaft joints is configured to connect the third rotating shaft connection gear and the third rotating member, and the other one is configured to connect the third rotating member and the first transmission component (optionally, the first rotating member of the first transmission component, as described above). That is, the two third rotating shaft joints are respectively located at two sides of the third rotating member, and accomplish a final connection between the three transmission components, in order to synchronize rotations of the display of the optomechanical assembly and the frame assembly.

Further optionally, the third transmission component further includes: a plurality of additional rotating members and rotating shaft joints connected between either end of the third rotating member and the corresponding third rotating shaft joint. In view of above, the third transmission component can be formed as a transmission chain including a plurality of pairs of rotating members and rotating shaft joints connected in series. Optionally, any one of the above-mentioned the third rotating member, the third rotating shaft joint, as well as the plurality of additional rotating members and rotating shaft joints is made of a rigid material. In this way, rotations of the display of the optomechanical assembly and the frame assembly are synchronized.

It should be noted that the above-mentioned rotation transmission member including the first transmission component, the second transmission component and the third transmission component is merely an example implementation for realizing rotation synchronization between the optomechanical assembly (optionally, the display or the active display area) and the frame assembly, and the disclosure should in no way be considered as being limited thereto. Having benefited from teachings of the present disclosure, those skilled in the art can envisage other equivalent implementations, and all of them should fall within the scope of the present disclosure.

BRIEF DESCRIPTION OF THE DRAWINGS

These and other features and advantages of the present disclosure will be apparent from and elucidated with the embodiments described hereinafter with reference to the drawings.

DETAILED DESCRIPTION

Figure 1:
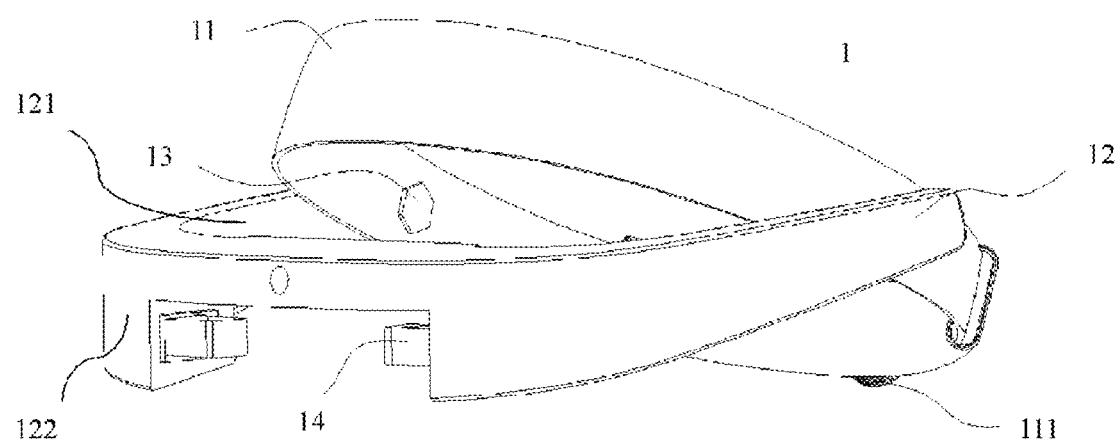
FIG. 1 schematically illustrates a perspective view of augmented reality glasses according to an embodiment of the present disclosure.

The augmented reality glasses provided by embodiments of the present disclosure will be described in detail below with reference to the drawings. It should be that the drawings are not necessarily drawn to scale. Rather, the focus is generally on the principle of the present disclosure. The size, position, and etc. of the various components and elements shown in the drawings are not intended to represent true sizes, positions, etc., and are merely intended to facilitate a comprehensive understanding of the principle of the present disclosure.

According to a specific embodiment, the present disclosure provides augmented reality glasses. Referring to FIG. 1, a detailed description of the augmented reality glasses is shown. FIG. 1 shows a perspective view of augmented reality glasses according to an embodiment of the present disclosure. In this figure, the augmented reality glasses 1 include a headgear assembly 11, a frame assembly 12, and a damping rotary structure 13 (partially visible in FIG. 1). In particular, the headgear assembly 11 can be configured to secure the augmented reality glasses 1 to the user's head. As can be seen in FIG. 1, as a specific example, in the augmented reality glasses 1, the headgear assembly 11 can be designed in an annular shape, and a knob 111 (partially visible in FIG. 1) can also be provided on the headgear assembly 11. Optionally, such a knob 111 is designed to adjust the size of the annular headgear assembly 11, so as to accommodate different head sizes of users. As can be seen from FIG. 1, by adjusting the knob 111, the diameter of the headgear assembly 11 can be enlarged or reduced, thereby facilitating wearing by different users. Of course, as will be readily appreciated by those skilled in the art, other similar adjustment mechanisms can be provided for the headgear assembly 11 to replace the knob 111. Moreover, the present disclosure does not impose any particular limitation on the position of such an adjustment mechanism and the manner in which it is deployed.

With further reference to FIG. 1, in the augmented reality glasses 1, the frame assembly 12 is configured to carry an optomechanical assembly 14, such as a display that provides a picture to the user during operation. As a specific example, the frame assembly 12 is designed to be U-shaped, as shown in FIG. 1. Further, the damping rotary structure 13 is configured to rotatably connect the headgear assembly 11 and the frame assembly 12, optionally rotatably connect at two ends of the U-shaped frame assembly 14. In this way, when the augmented reality glasses 1 are worn on the user's head, the user can see the picture displayed by the optomechanical assembly 14. As can be seen, the damping rotary structure 13 can include two sub-damping rotary structures (only one of which is visible in the figure), and the two sub-damping rotary structures are located at two ends of the U-shaped frame assembly 12 respectively. Those skilled in the art will appreciate that such positioning of the damping rotary structures 13 at two ends of the frame assembly 12 is merely one specific example for illustrating the principle of the present disclosure, and that the present disclosure should in no way be considered as being limited thereto. That is, the damping rotary structure 13 can be placed anywhere on the frame assembly 12 and further anywhere on the headgear assembly 11, so as to achieve a smooth connection between the two.

In view of the above, in the augmented reality glasses 1 provided by embodiments of the present disclosure, a smooth engagement between the frame assembly 12 and the headgear assembly 11 is achieved by including the damping rotary structure 13. Thereby, rotations of the frame assembly 12 and the headgear assembly 11 are facilitated, and problems such as lack of smooth, unstable degree of freedom, and the like are further avoided.

As a specific example, with continued reference to FIG. 1, the U-shaped frame assembly 12 also has an open portion (not visible in the figure), and at a position opposite to the open portion, the U-shaped frame assembly 12 further includes a recess portion. The optomechanical assembly 14 can be received in such a recessed portion. Of course, as will be appreciated by those skilled in the art, the optomechanical assembly 14 can also be provided at any other position of the U-shaped frame assembly 12, as long as pictures can be displayed to the user during operation.

Alternatively, in the augmented reality glasses 1, the frame assembly 12 can further include an inner casing 121 and an outer casing 122. Referring to FIG. 1, when the augmented reality glasses 1 are worn on the user's head, the inner casing 121 of the frame fits to the user's head while the outer casing 122 of the frame is exposed outside. Further optionally, the frame assembly 12 can further include an interior space sandwiched between the inner casing 121 and the outer casing 122. In such an interior space, other optional components can be further provided.

Figure 2:
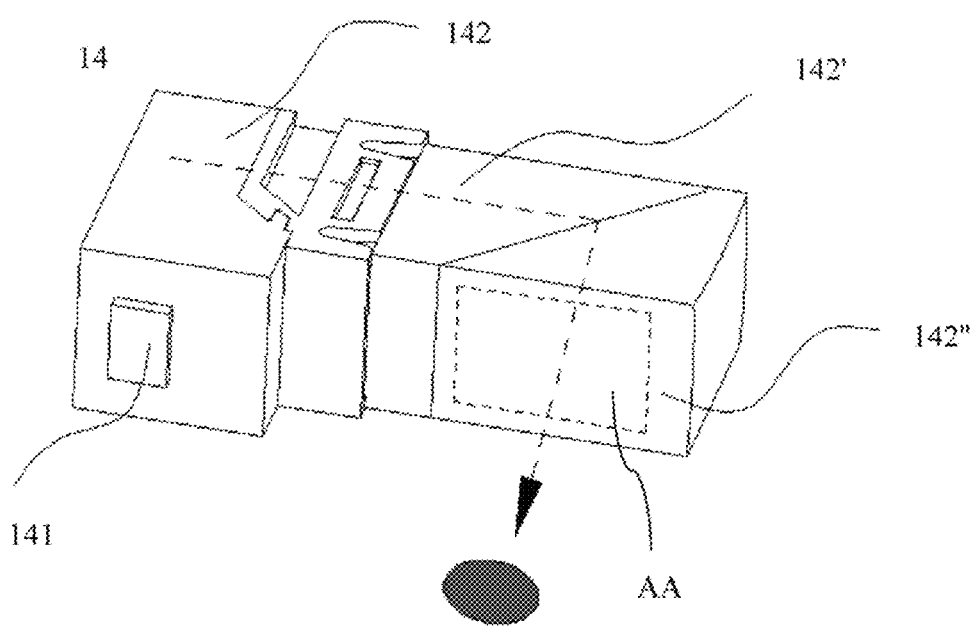
FIG. 2 schematically illustrates a perspective view of an optomechanical assembly within augmented reality glasses according to an embodiment of the present disclosure.

Next, referring to FIG. 2, a perspective view of an optomechanical assembly within the augmented reality glasses according to an embodiment of the present disclosure is schematically illustrated. As can be seen from FIG. 2, the optomechanical assembly 14 can include an input interface 141 for receiving a signal, a display, optionally including an active display area AA; and optics 142, 142', 142" for directing the signal into the active display area AA for display. It should be noted here that although three optics 142, 142', 142" are shown for the purposes of illustration in FIG. 2, the present disclosure should in no way be limited thereto. Based on the disclosure of the present disclosure, those skilled in the art can employ more or fewer optics to direct the input signal into the display or active display area, depending on the particular needs. In such a case, the display, optionally the active display area AA, can be configured to display a picture toward the user's eyes when the augmented reality glasses 1 are worn on the user's head. In FIG. 2, a black ellipse indicates the user's eyes schematically.

Alternatively, the optomechanical assembly 14 can also include an imaging element, and such an imaging element can be configured to record a scene in front of the user. Specifically, the imaging element can be disposed on top of the optomechanical assembly 14, under positioning as shown in FIG. 1. By means of such a scene capture, optionally, real-time scene capture, the environmental information around the user and the pre-stored information in the glasses can be superimposed on each other, thereby giving the user more rich and varied visual experience.

Figure 3:
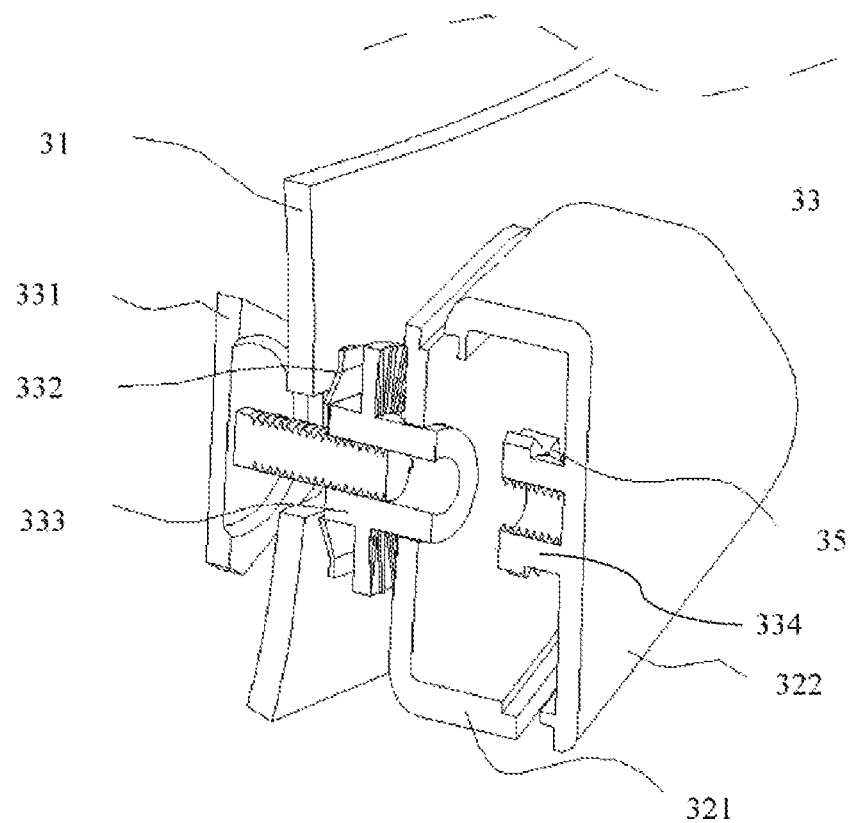
FIG. 3 schematically illustrates a cross-sectional view of a damping rotary structure within augmented reality glasses according to an embodiment of the present disclosure.

Referring to FIG. 3, a cross-sectional view of a damping rotary structure within augmented reality glasses according to an embodiment of the present disclosure is schematically illustrated. As shown in FIG. 3, in a specific embodiment of the present disclosure, the damping rotary structure 33 can include a screw 331, an elastic spacer 332, a damping element 333, and a stud 334. In such an embodiment, the elastic spacer 332 and the damping element 333 are stacked on the outer side of the headgear assembly 31, and the inner side of the damping element 333 is threaded for engagement with the screw 331. In this way, the screw 331 passes through the headgear assembly 31 and the elastic spacer 332 sequentially, and ultimately engages with the thread inside the damping element 333. Further, the other end of the damping element 333 is also designed to pass through the inner casing 321 of the frame assembly, and ultimately engage with the stud 334 provided on the outer casing 322 of the frame assembly. As an example, the engagement between the damping element 333 and the stud 334 on the outer housing 322 of the frame can be accomplished by means of a threaded connection. In such a case, corresponding threads can be provided on the damping element 333 and the stud 334.

By means of the damping rotary structure 33 shown above with reference to FIG. 3, an adjustable rotation between the frame assembly 12 and the headgear assembly 11, 31 is achieved. In such a case, the screw 331 penetrates through the headgear assembly 31 and the elastic spacer 332 in a cylindrical shape. Therefore, there is no relative rotation between the three, thereby avoiding unnecessary material wear. In addition, the other end of the screw 331 or the damping element 333 also penetrates through the inner casing 321 of the frame assembly in a cylindrical shape, and ultimately engages with the stud 334. In such a case, the contact surface between the screw 331 or the damping element 333 and the inner casing 321 of the frame assembly constitute a damping surface of the entire system, wherein an axial array of elongated strip projection structures is correspondingly distributed on their surfaces, thereby providing a uniform adjustment during rotation. In addition, it should be noted that during actual use, the headgear assembly 31, the elastic spacer 332, and the damping element 333 generally remain stationary, while the screw 331, the inner casing 321 and the outer casing 322 of the frame assembly can be rotated simultaneously.

Figure 4:
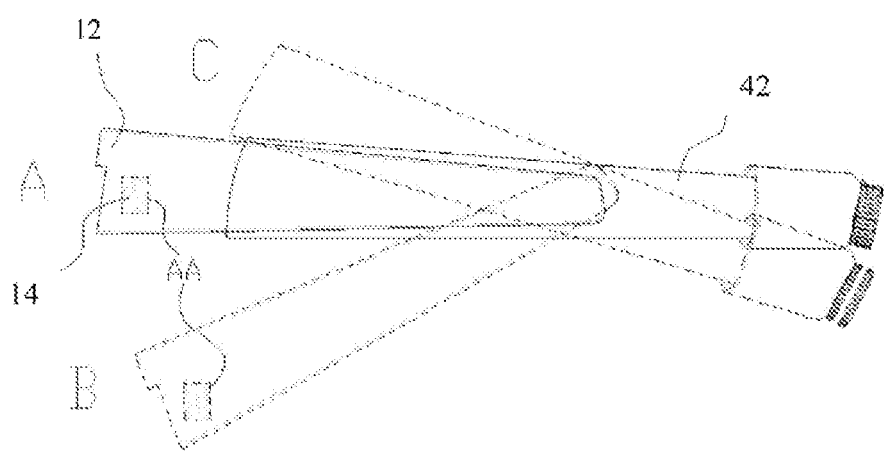
FIG. 4 schematically illustrates a rotation schematic of a frame assembly and an optomechanical assembly within augmented reality glasses according to an embodiment of the present disclosure.

According to another embodiment, in the augmented reality glasses, the display in the optomechanical assembly, optionally, the active display area, can be rotated in a reverse direction with rotation of the frame assembly. Such a synchronized rotation is discussed in detail below with respect to FIG. 4, which schematically illustrates a rotation schematic view of the frame assembly and the optomechanical assembly within the augmented reality glasses according to an embodiment of the present disclosure. Those skilled in the art will generally appreciate that if the active display area AA of the display allows the displayed picture to enter the user's eyes substantially perpendicular to the eyeball section of the user, this is extremely advantageous for the user experience, because it provides the most comfortable viewing experience. As can be seen from FIG. 4, when the user stands up straight and the frame assembly 42 is substantially horizontally worn on the user's head, i.e., at position A in the figure, the screen information provided by the active display area AA can propagate in the horizontal direction and enter the user's eyes perpendicular to the eyeball section of the user. Assume that the frame assembly 42 is rotated within the vertical plane and is rotated to position B as shown in FIG. 4. In this case, if the active display area AA remains fixed in the optomechanical assembly and further in the augmented reality glasses, the display picture emitted therefrom will be less likely to enter perpendicularly to the eyeball section of the user, and this phenomenon is clearly illustrated in FIG. 4. The same phenomenon will also occur when the frame assembly 42 is rotated up to position C. In view of such a consideration, applicants of the present application propose that during rotation of the frame assembly 42, the active display area AA is correspondingly rotated in a reverse direction. Thereby, it is ensured that the user can receive the displayed picture entering the eyes vertically at any position.

To this end, in one embodiment of the present disclosure, a rotation transmission member is also provided for the augmented reality glasses. Such a rotation transmission member is configured to synchronize rotation of the frame assembly with rotation of the display, optionally with the two directions of rotation being reverse and the angle of rotation being equal. In this way, when the augmented reality glasses are worn on the user's head, the picture displayed by the display enters the user's eyes substantially vertically, thereby providing an optimal user experience. This means that the user can wear the augmented reality glasses in any way without affecting the optimal user experience.

Figure 5:
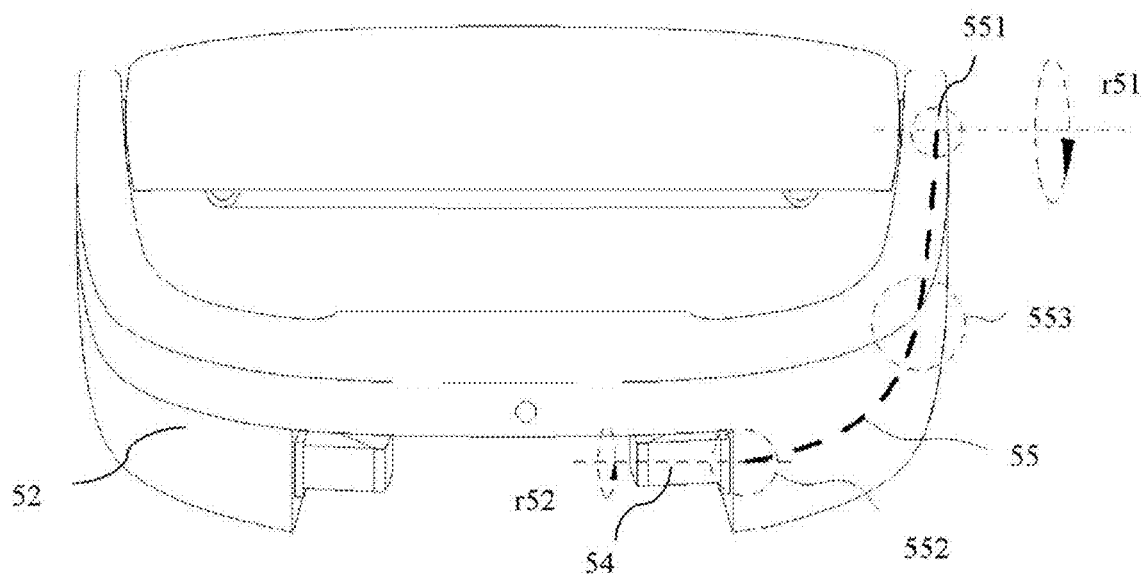
FIG. 5 schematically illustrates a simplified view of a rotation transmission member of augmented reality glasses according to an embodiment of the present disclosure.
Figure 7:
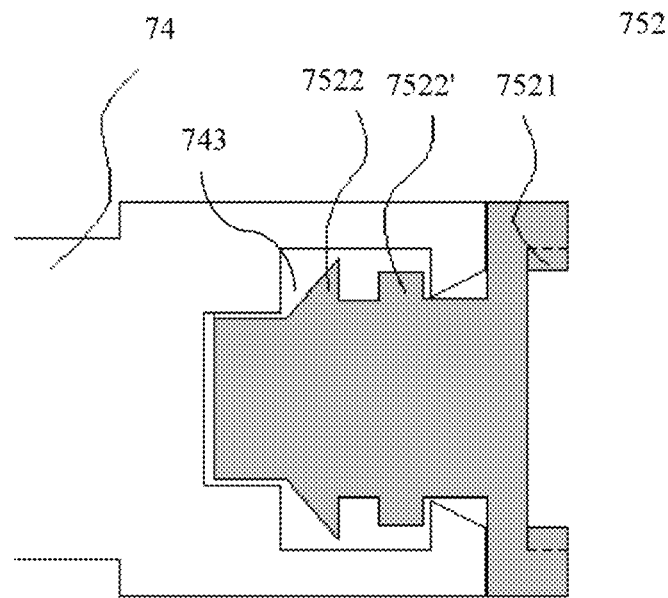
FIG. 7 schematically illustrates a perspective view of a second transmission component within augmented reality glasses according to an embodiment of the present disclosure.
Figure 8:
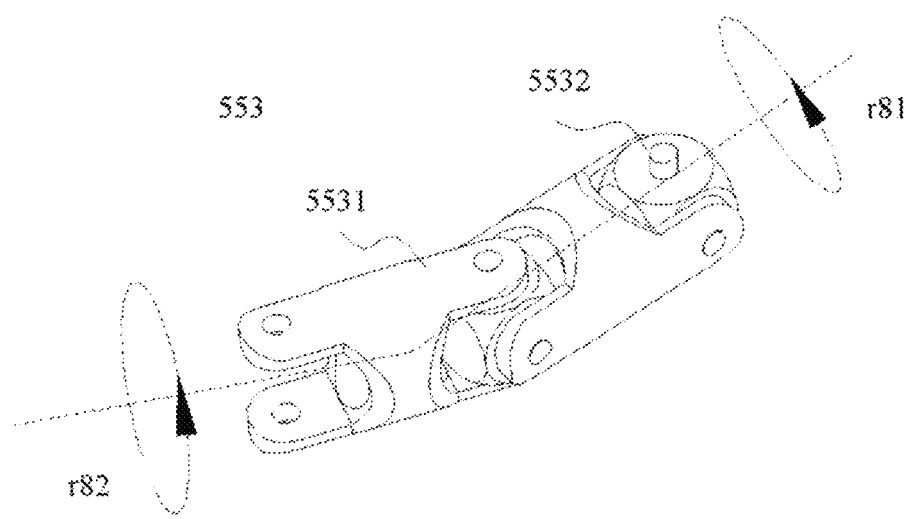
FIG. 8 schematically illustrates a perspective view of a third transmission component within augmented reality glasses according to an embodiment of the present disclosure.

Next, a rotation transmission member within the augmented reality glasses according to an embodiment of the present disclosure will be described in further detail with reference to FIGS. 5-8. FIG. 5 shows a simplified view of the rotation transmission member, and FIGS. 6-8 illustrate perspective views of three different components that compose of the rotation transmission member, respectively.

According to a specific implementation, the rotation transmission member 55 can be disposed within the frame assembly 52, optionally within the space between the outer casing and the inner casing of the frame. It should be noted that although only one rotation transmission member 55 is illustrated herein for the sake of brevity, it will be apparent to those skilled in the art that any suitable number of rotation transmission members can be employed and the present disclosure is not limited in this aspect. Optionally, as an example, in the U-shaped frame assembly 52 shown in FIG. 5, two rotation transmission members can be provided, and the two rotation transmission members can be located at the left branch and the right branch of the U-shaped frame shown in FIG. 5 respectively Further, the rotation transmission member 55 can include three sub-members, i.e., a first transmission component 551, a second transmission component 552, and a third transmission component 553. Specifically, the first transmission component 551 is disposed adjacent to the damping rotary structure, i.e., at an end of the U-shaped frame assembly 52, and is engaged with the frame assembly 52. In addition, the second transmission component 552 is engaged with the optomechanical assembly 54, i.e., adjacent to the optomechanical assembly 54. Further, the third transmission component 553 is configured to connect the first transmission component 551 and the second transmission component 552. With the three transmission components 551, 552, 553, rotation of the frame assembly 52 is allowed to be reversely synchronized to rotation of the optomechanical assembly 54, as can be seen with reference to the rotation indicators r51 and r52 in FIG. 5, wherein the directions of rotation r51 and r52 are opposite to each other.

Figure 6:
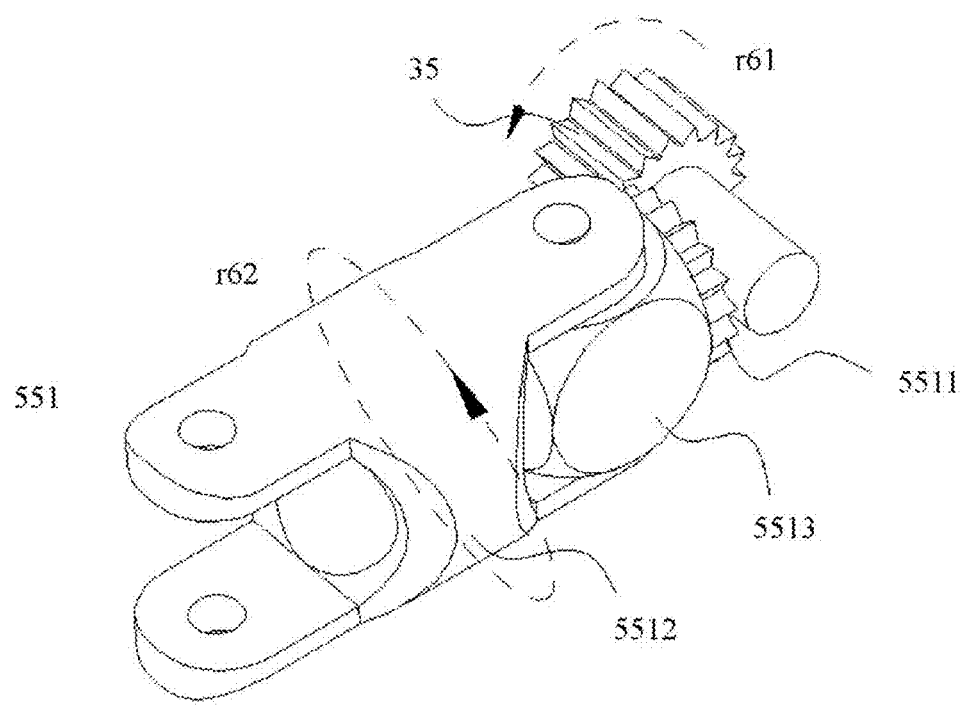
FIG. 6 schematically illustrates a perspective view of a first transmission component within augmented reality glasses according to an embodiment of the present disclosure.

In a specific embodiment, as shown in FIG. 6, the first transmission component 551 can include: a first rotating shaft connection gear 5511, a first rotating member 5512, as well as a first rotating shaft joint 5513 connecting the first rotating shaft connection gear 5511 and the first rotating member 5512. In such an embodiment, the first rotating shaft connection gear 5511 can be further configured to engage with a transmission gear 35 (with reference to FIG. 3) disposed on the outer casing of the frame assembly. Thereby, a rotation engagement between the first transmission component 551 and the frame assembly 52 is finally obtained. As can be seen from FIG. 6, the interaction between the three parts 5511, 5512, 5513 of the first transmission component 551 and the transmission gear 35 on the outer casing of the frame enables the rotation r61 of the transmission gear 35 (i.e., the frame assembly 52) to be converted into the rotation r62 of the first rotating member 5512.

Further, according to another embodiment, the second transmission component 552 can include a limit block 752. Specifically, referring to FIG. 7, one end of such a limit block 752 is provided with a second gear 7521 (shown schematically in cross-sectional view here). Such a second gear 7521 is configured to engage with the third transmission component, in particular, with the third rotating shaft connection gear of the third transmission component, which is described in further detail below. In addition, limit slots 7522, 7522' can be provided inside the limit block 752. The limit slots 7522, 7522' can be configured to engage with a limit hole 743 in the optomechanical assembly 74, such that the active display area AA can be reversely rotated with rotation of the frame assembly. It should be noted here that although two limit slots 7522, 7522' and one corresponding limit hole 743 are shown in the drawings and are listed in the specification, the present disclosure should not be limited thereto. Those skilled in the art, having benefited from teachings of the present disclosure, are able to select any number of limit slots and limit holes depending on the particular situation, so as to achieve a valid engagement therebetween. Thereby, rotation of the second transmission component 552 is allowed to be transmitted to the optomechanical assembly 74 in a specific manner, and ultimately the active display area AA.

Alternatively, in a further variation of the above embodiment, the limit slots 7522, 7522' in the stop block 743 can also be designed to be able to decouple from the limit holes 743 in the optomechanical assembly 74. In this way, rotation of the optomechanical assembly 74 (optionally, the active display area AA) is allowed to be decoupled from rotation of the frame assembly. This design allows for the possibility that the user manually adjusts the positioning of the optomechanical assembly 74 (optionally, the active display area AA) without being affected by any motion (optionally, rotation) of the frame assembly. This allows the user to use the augmented reality glasses more flexibly and, depending on the specific situation, chooses to utilize the rotation or manual adjustment of the frame assembly to achieve proper positioning of the active display area.

Further, according to still another embodiment, the third transmission component 553 can include a third rotating member 5531 and a third rotating shaft joint 5532, as shown in FIG. 8. In this case, the third rotating shaft joint 5532 can be configured to connect the third rotating member 5531 and the first transmission component, optionally, the first rotating member 5512 of the first transmission component 551 as shown in FIG. 6. In this way, the rotation r81 shown in the drawing is converted into the rotation r82. Further, as can be seen from FIG. 6, the rotation r61 of the transmission gear 35 on the frame assembly (i.e., the frame assembly) can be converted into the rotation r82 shown in FIG. 8 with the help of the first transmission component 551 and the third transmission component 553. Moreover, in order to facilitate engagement with the second transmission component 552 (i.e., the limit block 752), the third transmission component 553 can further include another third rotating shaft joint and a corresponding third rotating shaft connection gear. Similar to the first transmission component 551 shown in FIG. 6, in this case, in the third transmission component 553, such a third rotating shaft connection gear can be designed to engage with the second transmission component, optionally, with the second gear 7521 of the limit block 752 shown in FIG. 7. In addition, in the third transmission component 553, said another third rotating shaft joint can be configured to connect the third rotating shaft connection gear and the third rotating member 5531. In other words, the two third rotating shaft joints are respectively located at two sides of the third rotating member 5531. Finally, by means of the connection between the three transmission components 551, 552, 553, the reverse synchronization in rotation between the active display area of the optomechanical assembly and the frame assembly is allowed.

Further optionally, the third transmission component 553 described above with reference to FIG. 8 can further include: a plurality of additional rotating members and rotating shaft joints connected between either end of the third rotating member 5531 and the corresponding third rotating shaft joint. In view of above, the third transmission component 553 can be formed as a transmission chain including a plurality of pairs of rotating members and rotating shaft joints connected in series. As an example, any one of the above-mentioned the third rotating member, the third rotating shaft joint, as well as the plurality of additional rotating members and rotating shaft joints is made of a rigid material. In this way, rotations of the active display area of the optomechanical assembly and the frame assembly are synchronized.

In addition, it should be noted that the above-mentioned rotation transmission member including the first transmission component, the second transmission component and the third transmission component is merely an example implementation for realizing rotation synchronization of the active display area of the optomechanical assembly with the frame assembly, and the disclosure should in no way be considered as being limited thereto. Having benefited from teachings of the present disclosure, those skilled in the art can envisage other equivalent implementations, and all of them should fall within the scope of the present disclosure.

The present disclosure achieves a smooth engagement between the frame assembly and the headgear assembly by the augmented reality glasses described above including a damping rotary structure, thereby avoiding problems such as lack of smooth, unstable degree of freedom, and the like caused by a single screw fastener. Moreover, in embodiments of the present disclosure, the rotation synchronization between the optomechanical assembly and the frame assembly is also achieved by additional rotation transmission members and thereby providing an optimal visual experience.

It should be noted that in the detailed description of the present disclosure, terms which are used to indicate the orientation or positional relationship such as "upper", "lower", "front", "back", "left", "right", "vertical", "horizontal", "top", "bottom", "inner", "outer", etc. are based on the orientation or positional relationship shown in the drawings, and are merely intended to simplify the description of the present disclosure, rather than implying the particular orientation of the device or component involved must be constructed or operated in a particular orientation. Therefore, all such terms and other terms that have the equivalent meaning are not to be construed as limiting the disclosure.

It should also be noted that in the detailed description of the present disclosure, terms such as "first", "second", etc. are used for descriptive purposes only and are not to be construed as implying relative importance or the number of technical features indicated. Thus, features defined by the terms "first," "second," etc. can include one or more of these features either explicitly or implicitly. Unless otherwise stated, in the description of the present disclosure, the meaning of "a plurality" is two or more.

It should be further noted that in the description of the present disclosure, terms such as "installation", "joining", "connecting", etc. should be understood in a broad sense unless otherwise defined. For example, it can be a fixed connection, a detachable connection, or even an integral connection. Similarly, it can be a direct connection, an indirect connection through an intermediate medium, or even a communication within two elements. Those skilled in the art can understand the specific meanings of the above terms in the present disclosure according to specific circumstances.

It should also be noted that in the description of the specification, specific features, structures, materials or characters can be combined in any suitable manner in any one or more embodiments or examples.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

The invention claimed is:

1. Augmented reality glasses, comprising:
a headgear assembly configured to secure the augmented reality glasses to a head of a user;
an optomechanical assembly comprising a display;
a frame assembly configured to carry the optomechanical assembly;
a damping rotary structure configured to rotatably connect the headgear assembly and the frame assembly, such that when the augmented reality glasses are worn on the head of the user, the user views a picture displayed by the display of the optomechanical assembly; and
a rotation transmission member configured to synchronize a rotation of the frame assembly with a rotation of the display, such that when the augmented reality glasses are worn on the head of the user, the picture displayed by the display enters eyes of the user substantially vertically,
wherein the rotation transmission member is inside the frame assembly and comprises:
a first transmission component adjacent the damping rotary structure and engaged with the frame assembly;
a second transmission component adjacent and engaged with the optomechanical assembly; and
a third transmission component between the first transmission component and the second transmission component.

2. The augmented reality glasses according to claim 1, wherein the frame assembly is U-shaped, and
wherein the damping rotary structure comprises two sub-damping rotary structures at a first end and a second end of the U-shaped frame assembly respectively.

3. The augmented reality glasses according to claim 2, wherein the frame assembly further comprises a recess at a position opposite to an open portion of the frame assembly,
wherein the recess penetrates through the frame assembly in a thickness direction thereof, and
wherein the optomechanical assembly is in the recess.

4. The augmented reality glasses according to claim 1, wherein the headgear assembly has an annular shape, and
wherein the headgear assembly comprises a knob for adjusting a size of the headgear assembly.

5. The augmented reality glasses according to claim 1, wherein the optomechanical assembly comprises:
an input interface configured to receive a signal; and
optics configured to direct the signal into the display for displaying,
wherein the display is configured to display the picture toward eyes of the user when the augmented reality glasses are worn on the head of the user.

6. The augmented reality glasses according to claim 5, wherein the optomechanical assembly further comprises:
an imaging element configured to record a scene in front of the user.

7. The augmented reality glasses according to claim 5, wherein the display is configured to rotate in a reverse direction with respect to a rotation of the frame assembly.

8. The augmented reality glasses according to claim 7, wherein the first transmission component comprises:
a first rotating shaft connection gear;
a first rotating member; and
a first rotating shaft joint connecting the first rotating shaft connection gear and the first rotating member, wherein the first rotating shaft connection gear engages with a transmission gear on an outer casing of the frame assembly.

9. The augmented reality glasses according to claim 7, wherein the second transmission component comprises:
   a limit block,
   wherein a first end of the limit block is provided with a second gear that is configured to engage with the third transmission component, and
   wherein limit slots are inside the limit block, and
   wherein the limit slots are configured to engage with a limit hole in the optomechanical assembly, such that the display rotates in a reverse direction with respect to the rotation of the frame assembly.

10. The augmented reality glasses according to claim 9, wherein the limit slots inside the limit block are further configured to decouple from the limit hole in the optomechanical assembly.

11. The augmented reality glasses according to claim 7, wherein the third transmission component comprises:
   a third rotating shaft connection gear configured to engage with the second transmission component;
   a third rotating member; and
   a pair of third rotating shaft joints,
   wherein a first one of the pair of third rotating shaft joints is configured to connect the third rotating shaft connection gear and the third rotating member, and a second one of the pair of third rotating shaft joints is configured to connect the third rotating member and the first transmission component.

12. The augmented reality glasses according to claim 11, wherein the third transmission component further comprises:
   a plurality of additional third rotating members and a plurality of additional third rotating shaft joints, connected to a first end or a second end of a corresponding additional third rotating member.

13. The augmented reality glasses according to claim 12, wherein any one of the third rotating member, the third rotating shaft joint, the plurality of additional third rotating members and the plurality of additional third rotating shaft joints is made of a rigid material.

14. The augmented reality glasses according to claim 12, wherein any one of the third rotating member, the third rotating shaft joint, the plurality of additional third rotating members and the plurality of additional third rotating shaft joints is made of a rigid material.

15. The augmented reality glasses according to claim 1, wherein the frame assembly comprises:
   an inner casing fitting the head of the user; and
   an outer casing that is exposed outside when the augmented reality glasses are worn on the head of the user,
   wherein the outer casing of the frame assembly is provided with a stud,
   wherein the damping rotary structure comprises a screw, an elastic spacer and a damping element,
   wherein the screw passes through the headgear assembly and the elastic spacer and engages with the damping element, and
   wherein the damping element passes through the inner casing of the frame assembly and engages with the stud.

* * * * *